United States Patent
Yao

(12) 
(10) Patent No.: US 6,687,423 B1
(45) Date of Patent: Feb. 3, 2004

(54) OPTICAL FREQUENCY-DIVISION MULTIPLEXER AND DEMULTIPLEXER

(76) Inventor: Xiaotian Steve Yao, 23324 Ridge Line Rd., Diamond Bar, CA (US) 91765

(*) Notice: Subject to any disclaimer, the term of this patent is extended or adjusted under 35 U.S.C. 154(b) by 248 days.

(21) Appl. No.: 10/038,067

(22) Filed: Oct. 24, 2001

Related U.S. Application Data

(60) Provisional application No. 60/243,204, filed on Oct. 24, 2000.

(51) Int. Cl.⁷ .............................. G02B 6/00; H04J 14/06
(52) U.S. Cl. .............................. 385/11; 385/24; 385/31; 385/15; 385/36; 398/65; 398/79; 398/85; 398/86; 398/43; 398/48
(58) Field of Search .............................. 385/11, 24, 31, 385/15, 16, 17, 35, 39, 36; 398/65, 79, 85, 86, 43, 48

(56) References Cited

U.S. PATENT DOCUMENTS

| | | | | |
|---|---|---|---|---|
| 4,566,761 A | * | 1/1986 | Carlsen et al. | 359/495 |
| 5,617,434 A | * | 4/1997 | Tamura et al. | 372/6 |
| 5,946,129 A | * | 8/1999 | Xu et al. | 359/332 |
| 6,097,518 A | * | 8/2000 | Wu et al. | 398/1 |
| 6,134,358 A | * | 10/2000 | Wu et al. | 385/16 |
| 6,208,442 B1 | * | 3/2001 | Liu et al. | 398/9 |
| 6,552,833 B2 | * | 4/2003 | Liu et al. | 398/82 |
| 6,587,608 B2 | * | 7/2003 | Cormack | 385/16 |
| 6,600,582 B1 | * | 7/2003 | Liu et al. | 398/79 |

* cited by examiner

Primary Examiner—Brian Healy
(74) Attorney, Agent, or Firm—Fish & Richardson P.C.

(57) ABSTRACT

Optical frequency-division filters for multiplexing and demultiplexing operations by combining wavelength-selective filtering and polarization properties of optical signals.

17 Claims, 13 Drawing Sheets

US 6,687,423 B1

OPTICAL FREQUENCY-DIVISION MULTIPLEXER AND DEMULTIPLEXER

This application claims the benefit of U.S. Provisional Application No. 60/243,204 filed Oct. 24, 2000.

BACKGROUND

This application relates to filtering and control of wavelength or frequency of optical signals, and more specifically, to techniques and devices for separating and combining optical signals of different frequencies or wavelengths.

Certain applications need to add or remove an optical spectral component at a selected wavelength in an optical signal. Various optical filters such as band-pass filters and other types of filters may be used to perform such operations.

One area of applications of adding or removing optical spectral components is wavelength-division multiplexing (WDM) devices and systems that use optical carriers of different wavelengths to transmit information in a single fiber. The WDM wavelengths are generally evenly spaced from one another according to a selected standard, such as the WDM wavelength grid by International Telecommunication Union. Such wavelength division multiple access technology can increase the information transmission capability of optical communication systems. In a WDM system, a channel of data may be added to other channels of data in a fiber link by adding an optical carrier at a selected wavelength that is modulated with the desired data. Conversely, a channel of data carried by an optical carrier may be "dropped" off from other channels in the same fiber at a desired location in the fiber network for data extraction, signal switching and routing, signal conditioning, or other signal processing functions. An optical multiplexer is a device that can be used to add one or more optical channels to other channels in a single fiber link. An optical demultiplexer is a device that can be used to remove one or more optical channels from other multiplexed channels in a single fiber link.

The capacity of each WDM fiber link is in part determined by the number of wavelengths that can be multiplexed together. In general, the spectral spacing between two adjacent wavelength channels should be as small as possible so that the number of channels within a given spectral range can be as large as possible without causing adverse signal interference between two adjacent channels. Some WDM systems have a minimum channel spacing of about 50 GHz and are primarily limited by the wavelength resolution of their wavelength division multiplexers and demultiplexers. Such WDM multiplexers and demultiplexers may be built based on a number of filtering mechanisms, including dielectric coated narrow band filters, diffraction gratings, fiber gratings, integrated waveguide array, interleaved Mach-Zehnder interferometers, interleaved birefringent interferometers and others.

Channels with a spacing of 10 GHz or less are desirable for adding more wavelength channels in WDM systems to increase the overall transmission speed and capacity of the systems. In addition, narrower channel spacing can lower the cost of the optical transmitter and receiver modules because high-speed time division multiplexing in each transmitter and receiver can be greatly reduced. For example, for a channel spacing of 2.5 GHz, the corresponding transceiver's speed can be reduced to 1.5 (=0.7×2.5) GHz.

SUMMARY

This application includes methods and devices for combining multiple optical signals with different optical wavelengths into a single fiber and for separating signals with different wavelengths in a single fiber into different signals in different optical paths, both based on their polarization properties. The channel spacing from a few megahertz to thousands of gigahertz may be achieved by such polarization-based multiplexing and demultiplexing. Such devices may be used in, among others, ultra-dense WDM systems, optical frequency division multiplexing systems, subcarrier carrier multiplexed (SCM) communication systems. Furthermore, the devices may be used to produce a strong pump beam by combining powers from many lasers with slightly different frequencies.

BRIEF DESCRIPTION OF THE DRAWINGS

Like reference symbols in the various drawings indicate like elements.

DETAILED DESCRIPTION

Figure 1A:
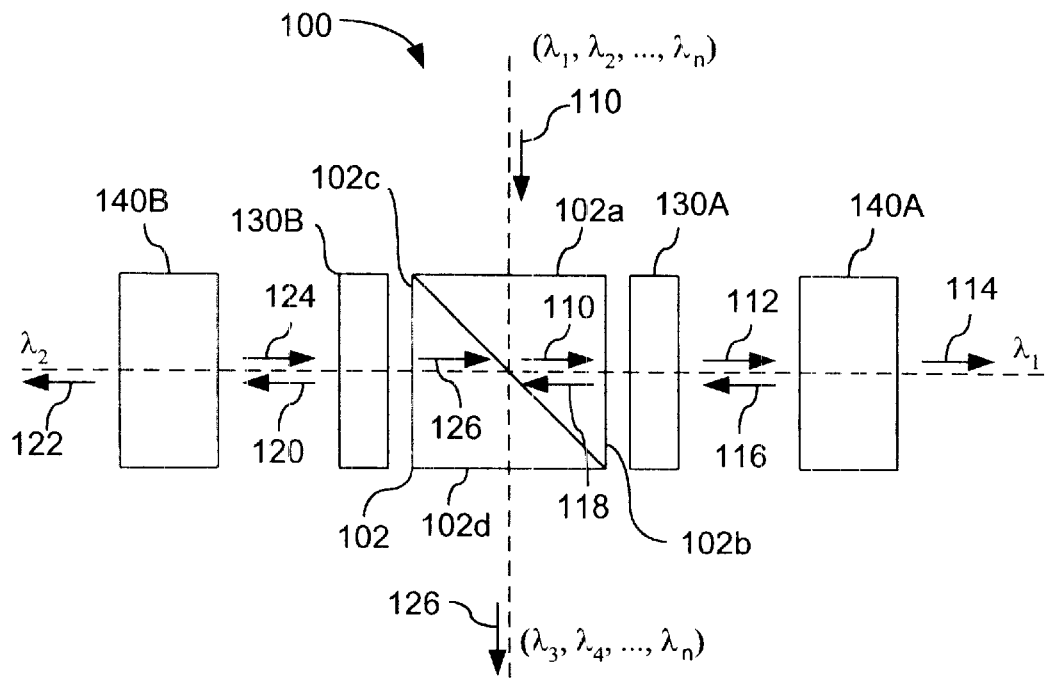
FIGS. 1A and 1B illustrate a polarization sensitive 4-port device for demultiplexing and multiplexing 3 frequency (wavelength) channels according to one embodiment.
Figure 1B:
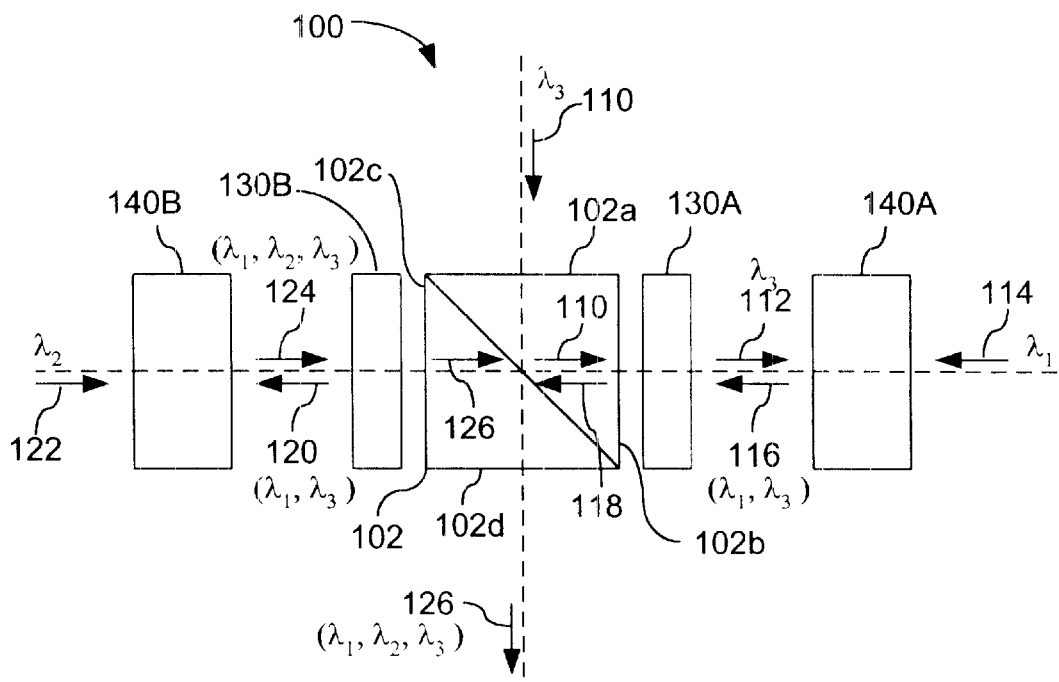

FIGS. 1A and 1B illustrate one embodiment of an optical frequency-division processing device 100 based on optical polarization. The device 100 includes a polarization beam splitter (PBS) 102 and two optical bandpass filters 140A and 140B with different optical transmission bands. Each filter is designed to transmit light within its transmission bandwidth and reflect wavelengths outside the transmission bandwidth. The PBS 102 may be formed of a polarizing cube which reflects one linear polarization at a 90-degree angle and transmits another orthogonal linear polarization. The two filters 140A and 140B generally transmit different frequencies with the transmission spectral window of the first filter 140A centered at a first frequency or wavelength ($\lambda_1$) and that of the second filter 140B at a second frequency or wavelength ($\lambda_2$), respectively. The first filter 140 is disposed relative to the PBS 102 to receive a reflected beam and to reflect the energy outside the transmission bandwidth back to the PBS 102. The second filter 140B is positioned on the opposite side of the PBS 102 to receive the light reflected from the first filter 140A and to direct the reflected portion back to the PBS 102.

The device 100 is structured in part based on polarization control of each beam reflected towards the PBS 102 by each filter. Two polarization elements, a first polarization transformer 130A and a second polarization transformer 130B, are respectively placed between the PBS 102 and the first filter 140A, and between the PBS 102 and the second filter 140B. Each polarization transformer is designed to produce a total rotation in polarization of about 90 degrees in light reflected from the respective filter after passing through the transformer for the second time. Hence, the polarization of the reflected light from the filter 140A is orthogonal to the polarization of light reflected towards the polarization element 130A by the PBS 102 and hence can transmit through the PBS 102 towards the second filter 140B. In one implementation, a quarter wave plate may be used as the polarization element 130A or 130B. In another implementation, the polarization element 130A or 139B is designed to rotate the polarization of a beam passing therethrough by 45 degrees towards a fixed direction regardless of the direction of the beam, e.g., a Faraday rotator.

The PBS 102 may be configured as a 4-port device, a first port 102a to receive a linearly-polarized input beam 110, a second port 102b to direct the input beam 110 to and to receive a beam from the first filter 140A through the polarization element 130A, a third port 102c to produce an output beam 126, and a fourth port 102d to direct a reflected beam from the first filter 140A to and to receive a reflected beam from the second filter 140B through the polarization element 130B. The polarization of the input beam 110 is oriented relative to the PBS 102 so that it is directed to the second port 102b while the orthogonal polarization transmits through the PBS 102 to reach the third port 102c as part of the output beam 126. When the PBS 102 is a polarizing cube, a diagonal polarization sensitive surface is formed in the cube to reflect light in a reflective polarization along X axis and to transmit light in a transmitting polarization along Y axis.

The device 100 is a 4-port device with input and output ports 102a, 140A, 102c, and 140B and is optically symmetric in the sense that the port 102a is symmetric with respect to port 102c and the port 140A is symmetric with respect to port 140A. In operation, the device 100 can be operated as a 3-channel optical-frequency-division multiplexer (OFDM) to perform both demultiplexing and multiplexing operations. Since the device 100 is polarization sensitive, the input beam should be linearly polarized.

FIG. 1A shows that the device 100 is operated to demultiplex different channels in an input signal 110 to the port 102a. The polarization of the input 110 is aligned with one polarization axis of the PBS 102 so the input is essentially directed to the port 102b of the PBS 102. The reflected input 110 first transmits through the first polarization element 130A to become a polarization-modified beam 112. Upon reaching the first filter 140A, light at the first frequency transmits through the first filter 140A and is "dropped" out as an output 114. The remaining portion of the input signal 110 at wavelengths other than the first wavelength ($\lambda 1$) is reflected by the first filter 140A as a reflected beam 116 towards the polarization element 130A. After transmitting through the polarization element 130A for the second time, the polarization of the reflected beam 116 is modified again as a beam 118 whose polarization is orthogonal to the polarization of the reflected input beam 110.

Therefore, the beam 118 will transmit through PBS 102 via port 102d without reflection to reach the second polarization element 130B for the first time. The polarization element 130B modifies the polarization state of the beam 118 to produce a beam 120. Next, the second filter 140B receives the beam 120 to transmit light at the second wavelength ($\lambda 2$) as an output beam 122 and reflects the light at other wavelengths back as a reflected beam 124 which passes through the polarization element 130B for the second time. The polarization element 130B modifies the polarization of the reflected beam 124 to produce a beam 126 whose polarization is orthogonal to the polarization of the beam 118. Thus, instead of transmitting the beam 126, the PBS 102 reflects the beam 126 to the port 102c as the output of the device 100.

Hence, in the above filtering operations, optical channels at the first and second wavelengths ($\lambda 1$ and $\lambda 2$) are filtered out as the output signals 114 and 122, respectively. The output signals 126 thus contains only the channels at other wavelengths.

The device 100 can also be operated to multiplex two or three different channels at different wavelengths by using any two of the ports 102a, 140A and 140B as input ports for input channels at respective wavelengths. For example, each of the filters 140A and 140B may also be used as an input port to receive an optical input signal at either the first or the second wavelength. The port 102a may be used to receive an input signal at a wavelength $\lambda 3$ which is different from the first and the second wavelengths.

FIG. 1B illustrates multiplexing of three channels by using the device 100. The polarization of an input beam 114 for the first filter 140A may be oriented so that its corresponding transmitted beam, after passing through the element 130A once, has a polarization along the Y axis and thus transmits through the PBS 102. Hence, the polarization of the input beam to each filter 140A or 140B is dependent on the nature of the polarization element 130A or 130B. If the polarization element 130A is a quarter wave plate, then the input polarization should be set to make the transmitted input beam through the filter 140A to be circularly polarized in a state as shown in FIG. 2C. If, on the other hand, the polarization element 130A is a 45-degree Faraday rotator, then the input polarization should be set to make the transmitted input beam through the filter 140A to be linearly polarized in the state as shown in FIG. 3C. Because the transmission band of the first filter 140A is different that of the second filter 140B, this beam is reflected back from the second filter 140B and is further directed to the port 102c by the operation of the PBS 102 because its polarization is rotated 90 degrees by passing through the element 130B twice. The polarization of an input beam 122 for the second filter 140B may be oriented so that the transmitted beam, after passing through the element 130B, is directed by the PBS 102 to the port 102c. Under the above operating conditions, the output signal 126 has three multiplexed channels at $\lambda 1$, $\lambda 2$, and $\lambda 3$, respectively.

The following describes additional features of the polarization elements 130A, 130B, and the filters 140A, 140B.

As described above, the polarization elements 130A and 130B essentially operate as polarization transformers to ensure the polarization of a reflected beam from a filter 140A or 140B, after passing it for the second time, is rotated by 90 degrees. Under this condition, the PBS 102 is transmissive to the reflected beam. One implementation of the polarization elements 130A and 130B uses quarter wave plates formed of birefringent materials such as birefringent crystals and birefringent non-crystal materials (e.g., one or more squeezed fiber segments whose birefringence is induced by pressure or polarization-maintaining fibers). Such a quarter wave plate has two orthogonal principal polarization axes and the relative optical retardation is one quarter of one wavelength of the light.

Figure 2A:
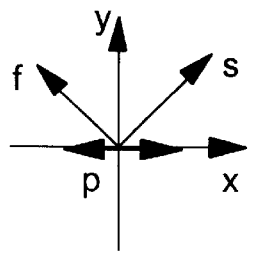
FIGS. 2A through 2G show the polarization states at various locations of the device shown in FIG. 1A when quarter wave plates are used.
Figure 2B:
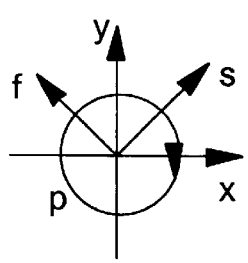
Figure 2C:
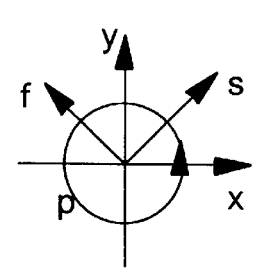
Figure 2D:
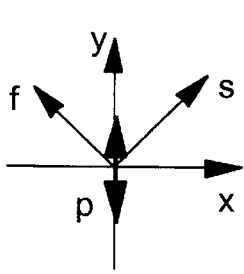
Figure 2E:
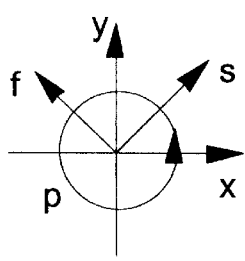
Figure 2F:
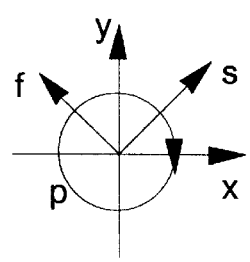
Figure 2G:
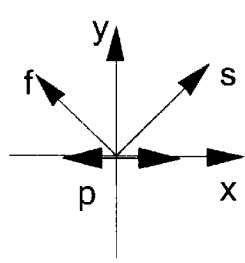

FIGS. 2A through 2G illustrate the relative orientation of the wave plates and the polarization states "p" of the optical signals at different locations in the device 100 shown in FIG. 1A, where "x" is the reflection axis of PBS 102, "y" is the passing axis of the PBS, "s" denotes the slow principal axis of quarter wave plates 130A and 130B while "f" denotes their fast principal axis. The input beam 110 to the port 102a is linearly polarized before reaching the quarter wave plate 130A and its polarization state is shown in FIG. 2A. The polarization of the beam 112 becomes circularly polarized as shown in FIG. 2B after passing through quarter wave plate 130A for the first time. After being reflected by the first filter 140A, the reflected beam 116 is still circularly polarized but with an opposite sense of rotation, as shown in FIG. 2C. After passing through the quarter wave plate 130A for the second time, the beam 118 further evolves into a linearly polarized beam as shown in FIG. 2D. However, now the polarization state is rotated 90 degrees compared with that of the beam 110 shown in FIG. 2A. With this orthogonal polarization, beam 118 can pass through PBS 102. The polarization state of beam 120 becomes circular again following quarter wave plate 130B, as shown in FIG. 2E and then changes its sense of rotation after being reflected by the filter 140B, as shown in FIG. 2F. Finally, the beam 126 transmitted through the quarter wave plate 130B has a linear polarization orthogonal to that of the beam 118 but identical to that of the beam 110. Beam 126 is then reflected towards output port 102c as the output 126.

Figure 3A:
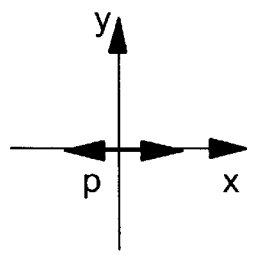
FIGS. 3A through 3G show the polarization status at various locations of the device shown in FIG. 1A when 45-degree Faraday rotators are used.
Figure 3B:
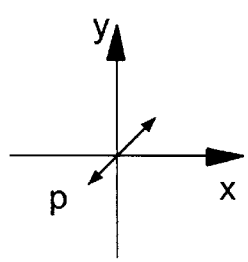
Figure 3C:
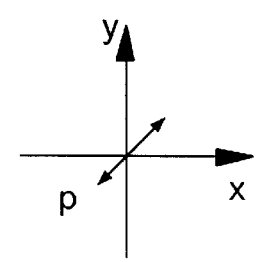
Figure 3D:
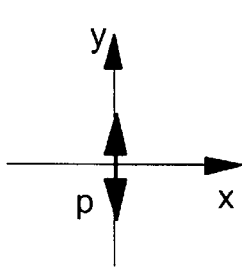
Figure 3E:
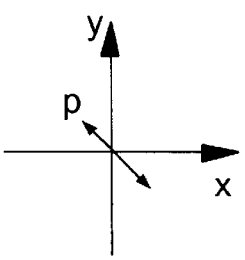
Figure 3F:
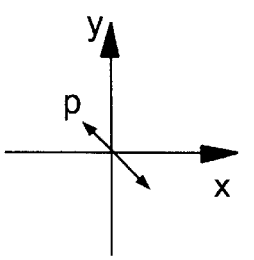
Figure 3G:
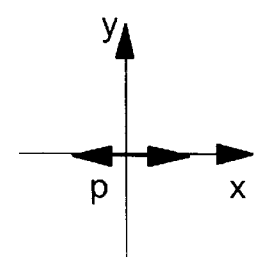

In another implementation, a 45-degree Faraday rotator may be used as either of the polarization transformers 130A and 130B. The polarization states at different locations in device 100 are shown successively in FIGS. 3A through 3G when both elements 130A and 130B are 45-degree Faraday rotators. FIG. 3A shows the polarization state of beam 110 when entering PBS 102. FIG. 3B is the polarization state of the beam 112 after passing through the Faraday rotator 130A for the first time. FIG. 3C corresponds to the polarization state of the beam 116 after reflection by the filter 140A. FIG. 3D illustrates the polarization state of the beam 118 after passing through Faraday rotator 130A for the second time. FIGS. 3E and 3F show the polarization states for the beam 120 after passing through Faraday rotator 130B for the first time and for the beam 124 after being reflected by the filter 140B, respectively. Finally, FIG. 3G corresponds to the polarization state of the beam 126 after passing through Faraday rotator 130B for the second time. This horizontally polarized beam is then reflected towards output port 102c by PBS 102.

In general, each of the filters 140A and 140B in device 100 of FIG. 1A is designed to transmit light within a transmission band centered at a selected center wavelength and reflect light in other wavelengths outside the transmission band. In WDM applications, the center wavelength of the transmission band is close or equal to the center wavelength of a WDM channel and the bandwidth of the transmission band is sufficient wide to transmit the channel without spectral clipping of the channel. The two filters 140A and 140B generally should have different transmission bands that are centered at different center wavelengths and do not overlap in frequency. For example, filters 140A and 140B may have transmission bands corresponding to two adjacent WDM channels wherein the frequency difference in their center wavelengths should not be less than their bandwidths to avoid any spectral overlap. Depending on the specific requirements of an application, the spacing between the center wavelengths of the filters 140A and 140B may range from sub GHz to about 100 GHz. Other WDM filters are known to operate with a spectral resolution on the order of tens of GHz or greater (e.g., 100 GHz for many commercial WDM filters). The device 100 in FIG. 1A, hence, can be designed to have spectral resolutions in the tens of GHz or greater. Notably, the device 100 in FIG. 1A can be designed with proper filters 140A and 140B to operate at a spectral resolution on the GHz level or even lower to increase the number of WDM channels for a given transmission band to increase the capacity of a fiber link.

Various optical bandpass filters with the above optical reflective and transmissive properties may be used to implement the filters 140A and 140B in the device 100 of FIG. 1A. Multi-layer interferometric filters formed of either multiple transmissive dielectric layers or alternating dielectric layers and thin metallic films and Fabry-Perot filters formed of one or more Fabry-Perot optical cavities, for example, may be used. A hybrid bandpass filter that combines an interferometric filter and a Fabry-Perot filter may also be used.

Notably, a Fabry-Perot (FP) filter can be designed to achieve ultra-narrow bandwidth so that the channel spacing of the device 100 in FIG. 1A can be narrow to, e.g., a few MHz, to achieve high channel capacity. One technique to achieve a narrow bandwidth is to build a FP cavity with a high quality factor Q by reducing optical loss in the cavity. Hence, the quality factor Q can be controlled to obtain different bandwidths to meet needs of different applications.

Figure 4A:
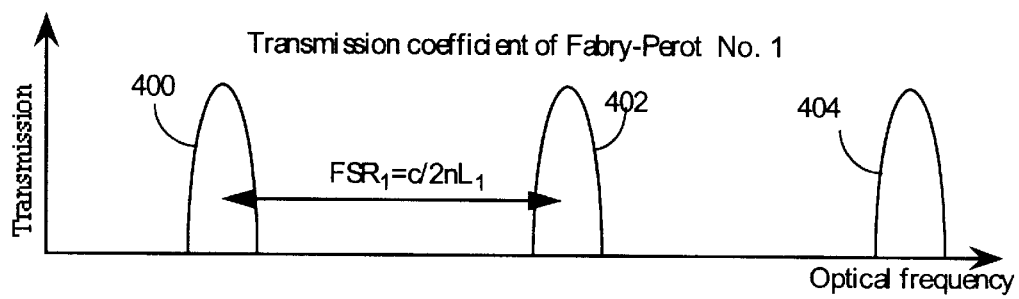
FIGS. 4A through 4E show filtering operations of the device in FIG. 1A when two reflective filters are Fabry-Perot filters.
Figure 4B:
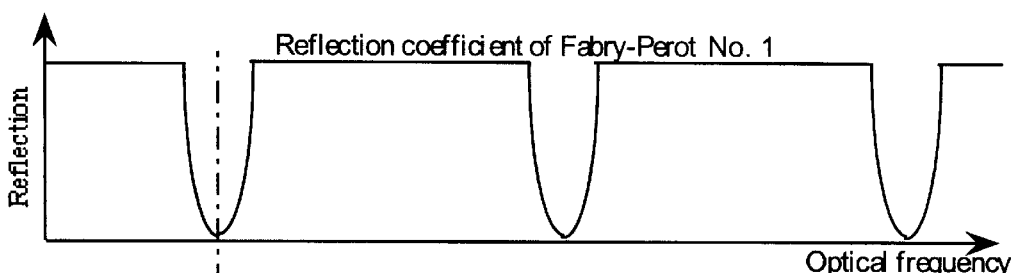
Figure 4C:
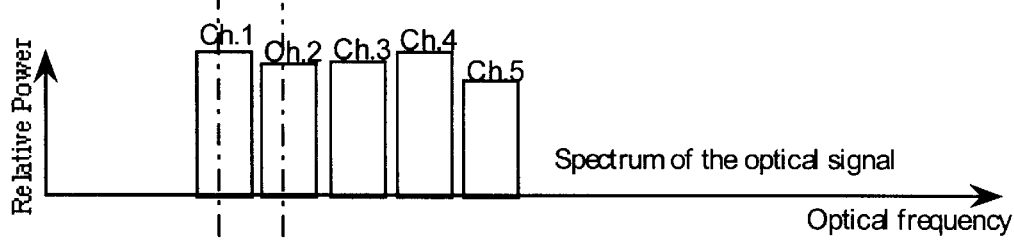
Figure 4D:
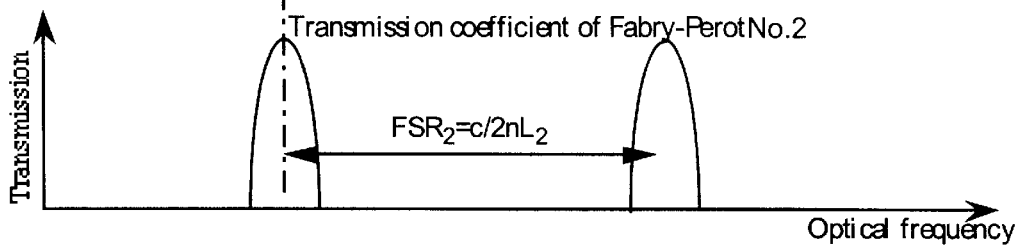
Figure 4E:
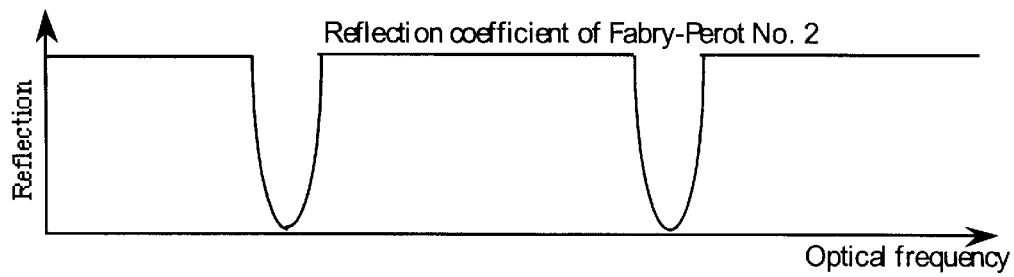

FIGS. 4A through 4E illustrate how Fabry-Perot filters No. 1 and No.2 are used in device 100 as filters 140A and 140B, respectively. FIGS. 4A and 4B are the transmission and reflection spectral curves of Fabry-Perot filter No. 1, respectively. Assuming each filter has an optical cavity with two planar reflectors, the free spectral range (FSR) of each filter is c/2nL where L is the spacing between the reflectors and n is the refractive index of the medium in the cavity. FIGS. 4D and 4E are the transmission and reflection spectral curves of Fabry-Perot filter No. 2, respectively. The frequency distribution of an input beam 110 containing five WDM frequency channels is shown in FIG. 4C. In the example shown, the two filters No. 1 and No. 2 are designed to have their transmission bands shifted from each other by one channel. Hence, the Fabry-Perot filter No. 1 is designed to transmit the channel 1 in the input beam 110 with a center frequency of $\lambda 1$ while reflecting other channels at $\lambda 2$, $\lambda 3$, $\lambda 4$, and $\lambda 5$. On the other hand, the Fabry-Perot filter No. 2 is designed to transmit channel 2 and reflect other channels. Note that each FP filter produces multiple transmission bands, e.g., the bands 400, 402, and 404 indicated in FIG. 4A. In order to ensure only one channel can transmit through a FP filter, the free-spectral range (FSR) of the filter should be equal to or greater than the spectral span of all WDM channels to be processed by the device 100. In the illustrated example, the 5 channels are shown to be within one free spectral range of both filters.

Figure 5A:
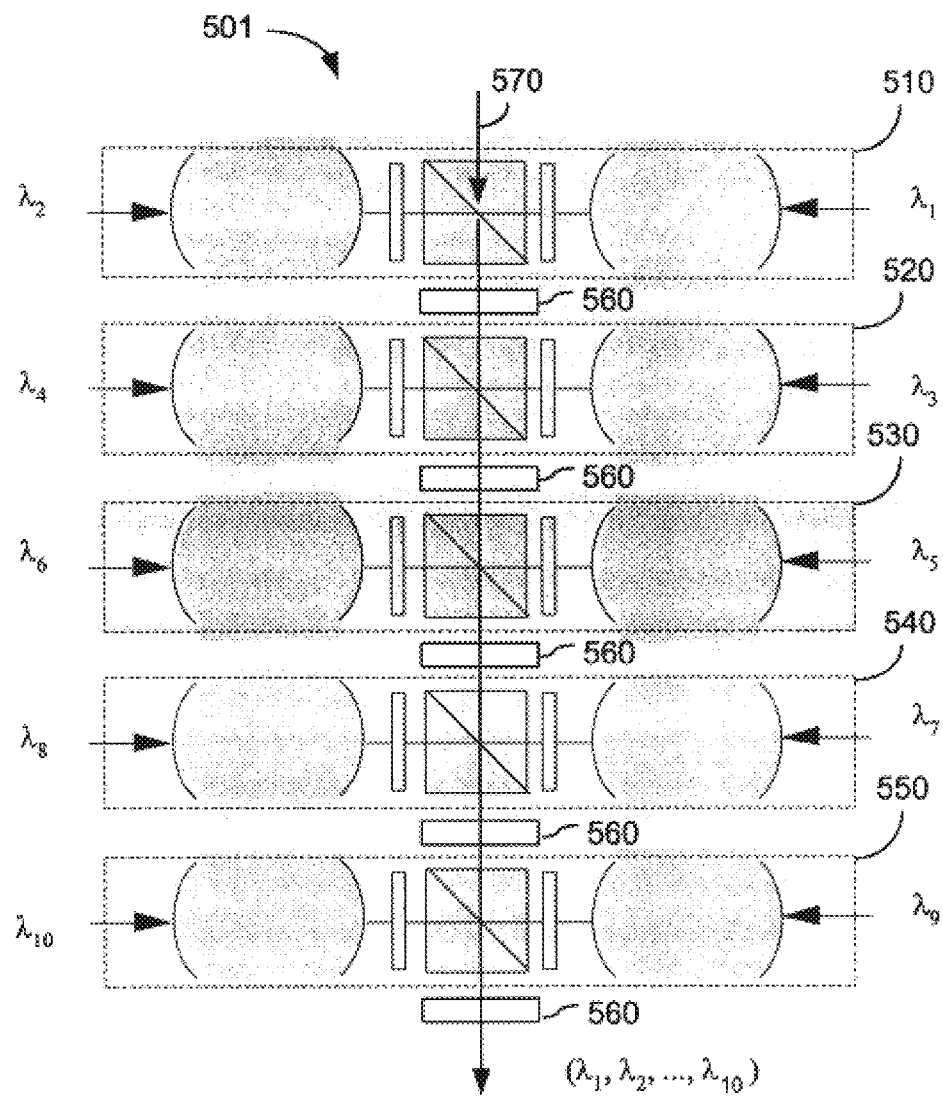
FIGS. 5A, 5B, and 6A, 6B, and 6C show exemplary devices based on the basic design in FIG. 1A.
Figure 5B:
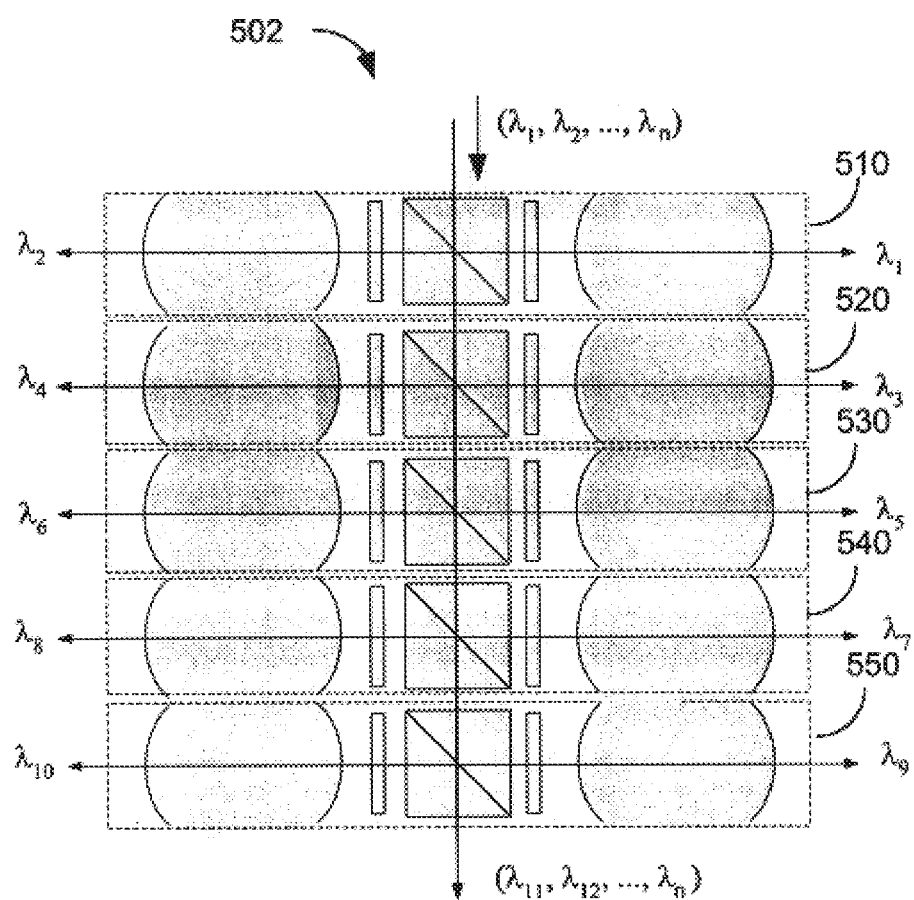

The above device 100 in FIGS. 1A and 1B may be used as a building block to construct OFDMs to process signals with more than 3 channels for multiplexing or demultiplexing operations. The design of the device 100 makes the polarization of each output channel to be parallel to the polarization of the input beam 100 because the total polarization rotation is 180 degrees after passing through each of the elements 130A and 130B twice. One or more structures similar to the device 100 but with different filters with different transmission bands can be cascaded together to filter out or add additional channels. FIG. 5A illustrates such a cascaded device 501 operating in the demultiplexing mode. The device 501 has multiple processing stages 510, 520, 530, 540, and 550 based on the design of the 4-port device 100. A polarizer 560 may be optionally placed between two adjacent stages to ensure the proper polarization of the input signal to each stage. In demultiplexing mode, input channels at different wavelengths are coupled into the device 501 through the filters in different stages. For example, the first stage 510 has filters with transmission bands at two adjacent channels $\lambda 1$ and $\lambda 2$ and thus are used to receive input channels at $\lambda 1$ and $\lambda 2$. The port 102a of the PBS 102 in the stage 510 may also receive an input signal 570 that has one or more channels to which other channels received in stages 510 through 550 through respective filters will be added. FIG. 5B shows a cascaded device 502 operating in a multiplexing mode. In an alternative embodiment, the stage 510 may be formed of two filters with transmission bands that are not adjacent to each other but separated by other bands. For example, the two filters in stage 510 may have transmission bands at $\lambda 1$ and $\lambda 3$ while the stage 520 have transmission bands at channels $\lambda 2$ and $\lambda 4$.

A multi-layer interferometric filter can be designed to have a single transmission band which transmits a selected WDM channel while reflecting light at wavelengths outside the transmission band such as other WDM channels. A Fabry-Perot filter is different from such a multi-layer interferometric filter in part because it generally has multiple transmission peaks that are separated by the free spectral range (FSR) defined by c/2nL, where c is the speed of light in vacuum, n refractive index of the medium in the cavity, and L length of the Fabry-Perot cavity, respectively. In order for a Fabry-Perot filter to pass only one channel, it is desirable that the filter's FSR is larger than the total optical bandwidth of the input beam or beams received by the filter (including all channels).

Referring back to FIG. 1A, the port 102a of the PBS 102 as an input port is different from the filter 140A or 140B as the input port in that the port 102a is not wavelength-selective while the filter 140A or 140B selects only the channel within its transmission band as input and rejects others. Hence, when the total spectral span of all input WDM channels in the input beam 110 received by the port 102a of the PBS 102 is larger than the FSR of the FP filter 140A or 140B, it is possible that two different channels separate by a spectral spacing greater than the FSR to transmits through the same filter by overlapping with two different transmission peaks, e.g., 400 and 402 as shown in FIG. 4A. This condition is undesirable and may be prevented by limiting the input spectral span at the port 102a.

Figure 6A:
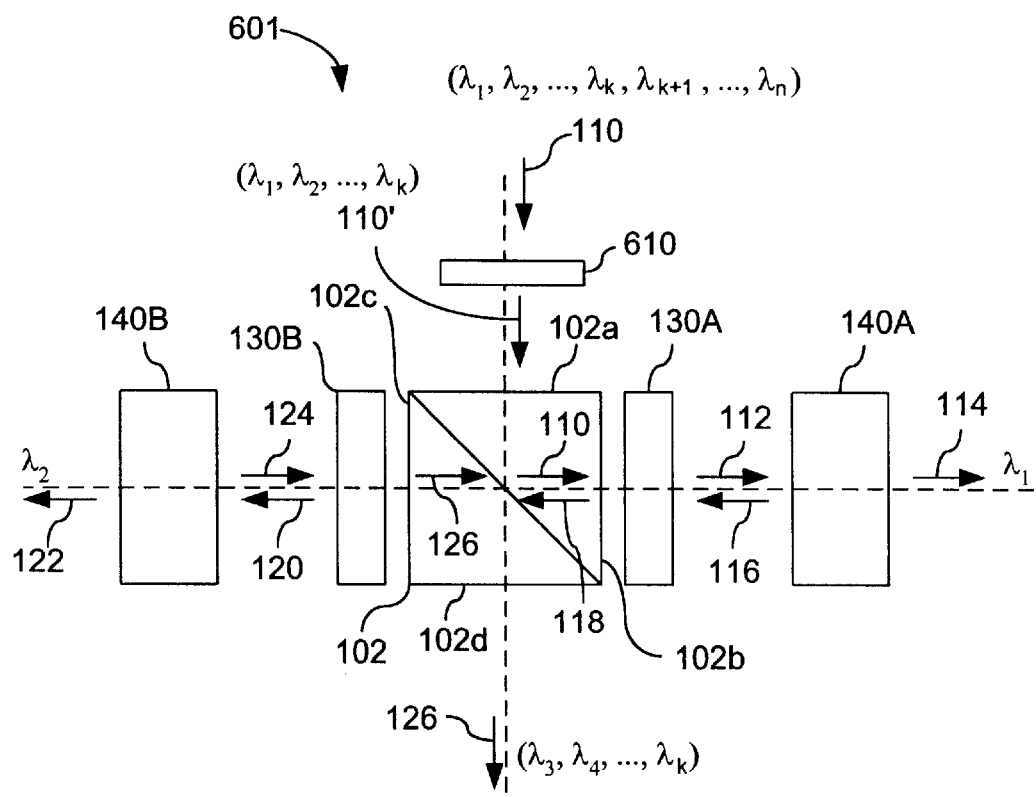

FIG. 6A illustrates a device 601 based on the above filtering technique according to one embodiment. An optical bandpass filter 610 with a bandwidth not greater than the FSR of the FP filters 140A and 140B is placed in the optical path of the input beam 110 before the port 102a of the PBS 102. The optical filter 610 may be designed to have a single transmission band such as a multi-layer interferometric filter with a bandwidth equal or less than the FSR. Alternatively, an optical low-pass or high-pass filter may also be used as the filter 610. As illustrated, the initial input beam 110 has n channels. The filter 610 filters out channels (k+1) through n to produce a filtered input beam 110' with only k channels whose spectral span is within the FSR of the FP filters 140A and 140B. After dropping the first two channels by the filters 140A and 140B, the output beam 126 has channels 3 through k. The output beam 126 may be further processed by one or more filtering devices that are cascaded together to filter out other channels based on the cascaded designs shown in FIGS. 5A and 5B.

Figure 6B:
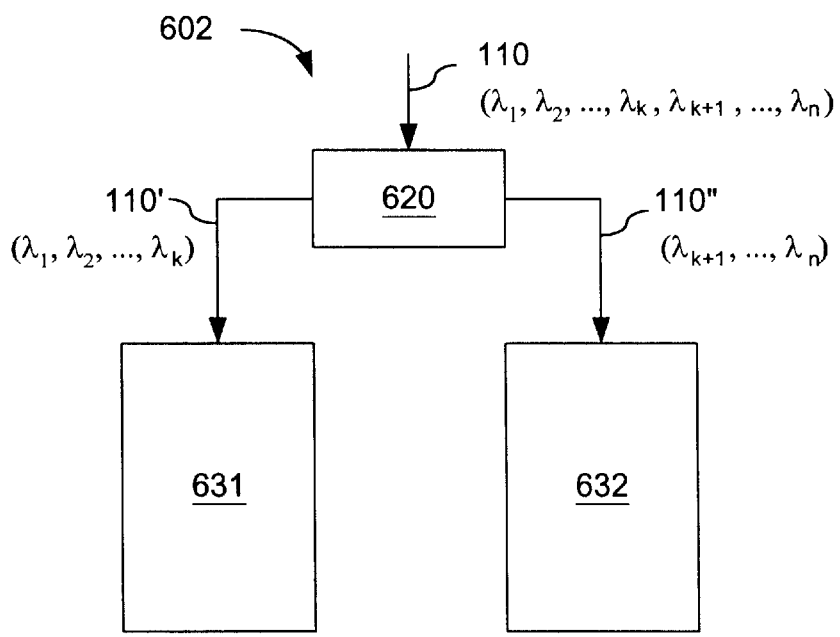

The above filtering operation by the filter 610 allows two or more devices as in FIG. 1A to be used to operate on different spectral sections of a WDM signal. FIG. 6B shows a device 602 based on the filtering mechanism in FIG. 6A to have two FDM devices 631 and 632 to process different spectral sections of an input WDM signal 110. The input 110 has a total of n channels with a spectral span greater than one FSR, among which only first k channels fall within one FSR of the fibers 140A and 140B and rest of the channels from (k+1) through n fall in another FSR. A filter element 620, which may include the filter 610 and other optical elements, is designed to separate all n channels into two groups, channels 1 through k in a first filtered input beam 110' and channels (k+1) through n in a second filtered input beam 110". Each of the devices 631 and 632 may be either the single device 100 in FIG. 1A or the multi-stage device 501 or 502 in FIGS. 5A and 5B. The filters in the device 631 have transmission bands for channels 1 through k and the filters in the device 631 have transmission bands for channels (k+1) through n. This parallel processing of different spectral sections of the input signal 110 can certainly be expanded to have three or more devices like 631 and 632 by using the filter element 620 to separate input channels into three or more groups.

Figure 6C:
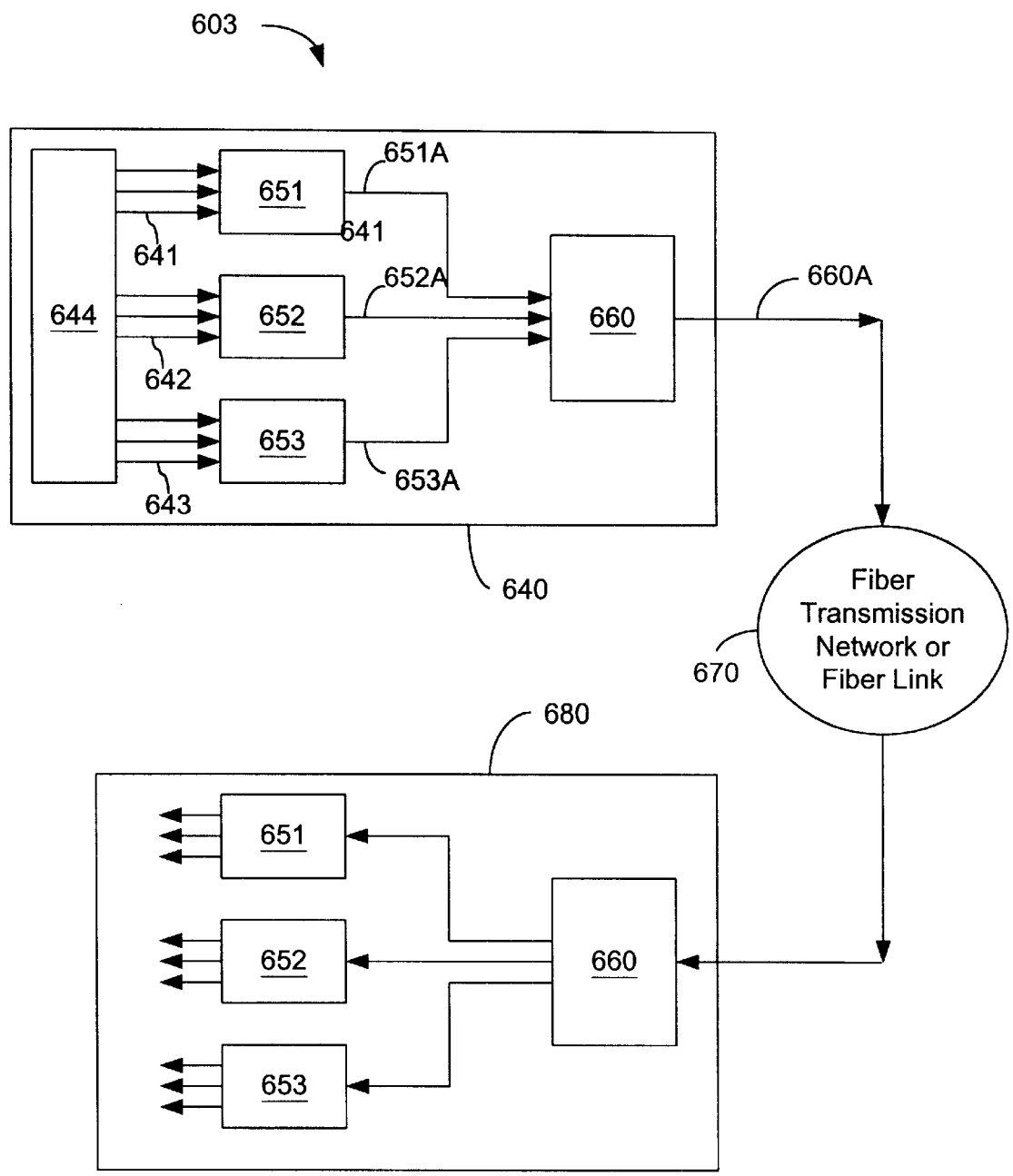

The above filtering mechanism can be combined with the narrow channel spacing of the devices in FIGS. 1A, 5A, and 5B to form WDM filters for densely-spaced WDM channels to increase the number of channels in a given transmission band in a fiber link or a fiber transmission network. FIG. 6C illustrates a fiber system 603 according to one embodiment. The fiber system 603 includes a transmission terminal 640, a fiber transmission network or a fiber link 670, and a receiver terminal 680. The transmission terminal 640 includes an array of optical transmitters 644 to generate multiple WDM channels in multiple adjacent spectral regions 641, 642, and 643. FDM devices 651, 652, and 653 are based on the devices in FIGS. 1A, 5A, and 5B with filters for all WDM channels for the adjacent spectral regions 641, 642, and 643, respectively. Each of the WDM devices 651, 652, and 653 combines received WDM channels into a multiplexed signal 651A, 652A, or 653A.

The transmission terminal 603 also includes a coarse WDM filter 660 to receive the signals 651A, 652A, and 653A and to combine them into an output WDM signal 660A for transmission through the fiber network 670 to the receiver terminal 680. The coarse WDM filter 660 has a coarse spectral resolution to resolve the spectral regions 641, 642, and 643 but cannot resolve the channel spacing between the individual WDM channels. The receiver terminal 680 has a filtering design similar to that in the transmission terminal 640 but operate in the reverse order to demultiplexer the WDM channels. Hence, the system 603 implements a 2-tier filtering design. The FDM devices 651, 652, and 653 with a high frequency resolution are used to multiplex or demultiplex individual WDM channels. The WDM device 660 is then used to multiplex or demultiplex signals 651A, 652A, 653A that are spectrally spaced from one another at a spacing much greater than the channel spacing.

Figure 7A:
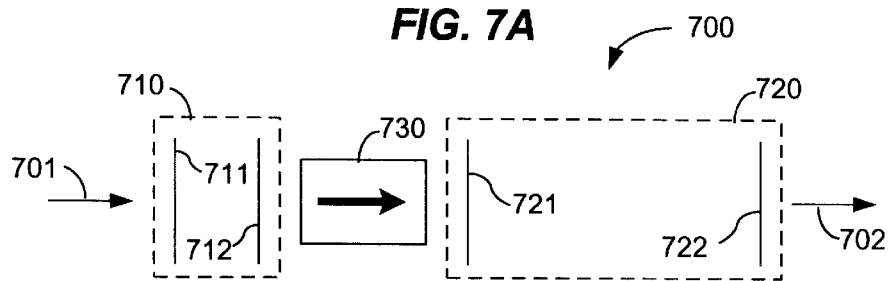
FIGS. 7A, 7B, 7C, and 7D show one embodiment of a filter for the device in FIG. 1A that cascades two Fabry-Perot filters.
Figure 7B:
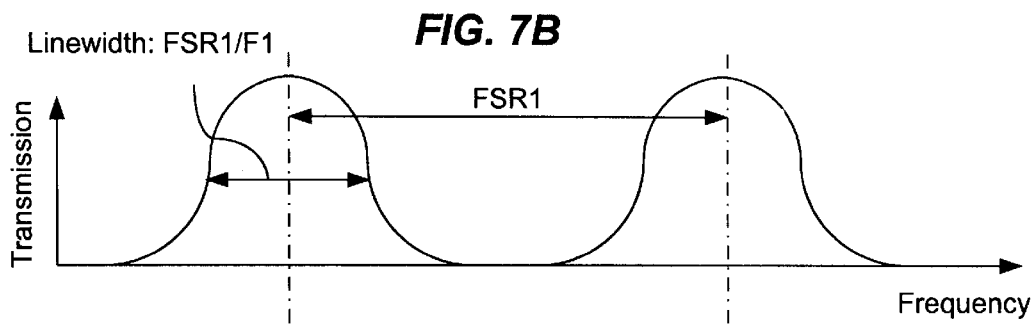
Figure 7C:
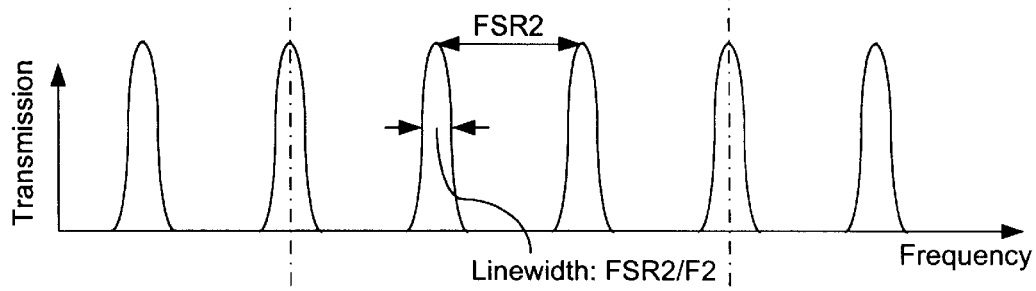
Figure 7D:
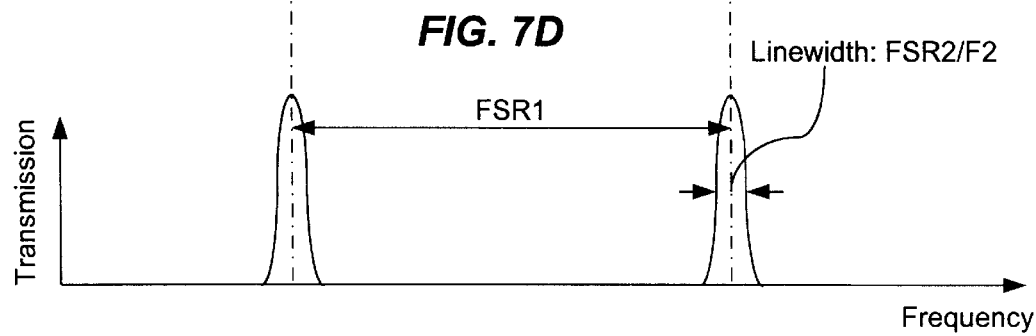

As described above, the devices in FIGS. 1A, 5A and 5B may be designed to resolve channel spacing to GHz and sub GHz level by using proper filters 140A and 140B. Such a fine channel spacing is smaller than the channel spacing resolvable by many commercial WDM filters. In the design shown in FIG. 6A, assuming that the bandwidth of the coarse interferometric filter 610 is 100 GHz and that the finesse (F=FSR/linewidth) of the FP filters 140A and 140B is 100 with a FSR of 100 GHz, the combination of the interferometric filter 610 and the FP filters 140A and 140B can yield a practical bandwidth of 1 GHZ. Consequently, the resulting device has a channel spacing of 1 GHz. Hence, in the system 603 in FIG. 6C, the WDM channels in different spectral regions 641, 642, and 643 can have a spacing of 1 GHz much lower than the tens of GHz and 100 GHz achieved in other WDM filters. The WDM filter 660 may be implemented with a WDM filter with a channel spacing in the range of tens of GHz or 100 GHz to multiplex the signals 651A, 652A, and 653A. FIG. 7A illustrates that two different Fabry-Perot filters 710 (formed by reflectors 711, 712) and 720 (formed by reflectors 721 and 722) with different FSRs and linewidths may be cascaded in a combination to yield larger Finesse and hence smaller actual bandwidth. An optical isolator 730 is placed between two FP filters 710 and 720 to prevent coupling between the filters. The cavity length of the longer filter 720 is multiple times of the shorter one. The combined filter 700 has a FSR determined by the shorter FP filter 710 and a bandwidth determined by the longer FP filter 720 (assuming both filters have the same Finesse). Consequently, the number of channels that can be separated by the cascaded filter 700 is multiplied. FIGS. 7B and 7C show the spectra of the short and long FP filters 710 and 720, respectively. FIG. 7D shows the transmission spectrum of the combination filter 700.

Figure 8A:
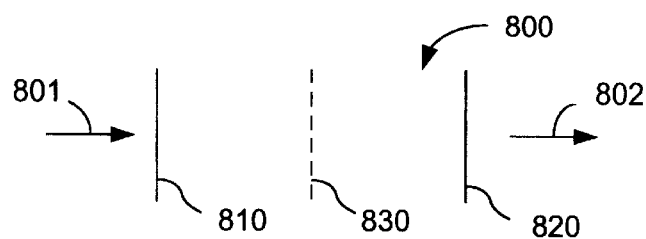
FIGS. 8A, 8B, and 8C show one embodiment of a filter for the device in FIG. 1A that has center mirrors between two end mirrors.
Figure 8B:
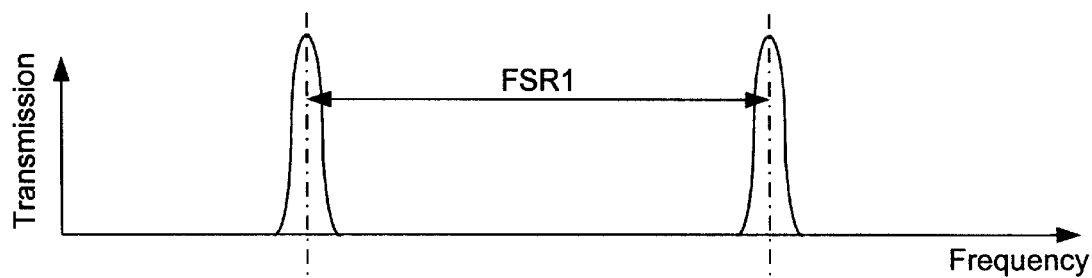
Figure 8C:
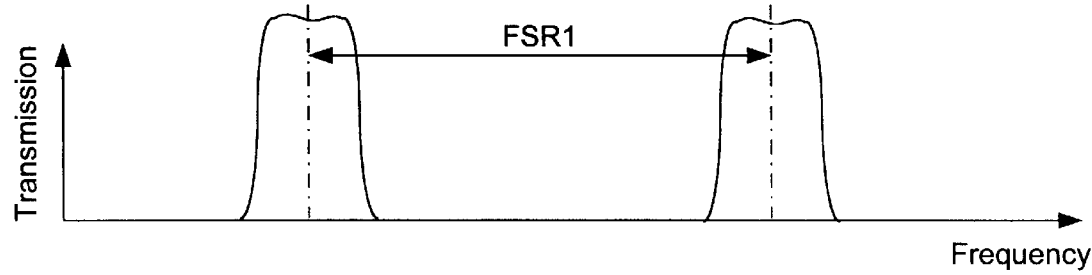

FIGS. 8A, 8B, and 8C illustrate constructing Fabry-Perot filter 800 with multiple mirrors 810, 820, and 830, where the mirrors 810 and 820 are two end mirrors and the numeral 830 represents one or more center mirrors located at different positions in the optical path between the end mirrors 810 and 820. The center mirrors 830 are partially transmissive and partially reflective. FIG. 8B shows the transmission spectrum of the filter 800 when the center mirrors 830 are completely transmissive. Under this condition, the filter 800 is a regular cavity with two end mirrors 810 and 820 and the transmission bands have a peaked top which can distort the spectral content in a WDM channel. FIG. 8C illustrates the effect of the center mirrors 830 with proper reflectivity on the output transmission spectrum of the filter 800. Notably, the reflectivity of the center mirrors 830 can be selected to produce a desirable flat profile on the top of the transmission peak of the filter 800. Such a flat top can be used in some applications for preserving spectral contents of the data-carrying pulses passing through the filter and thus are desirable in optical communications.

The above devices are sensitive to the input polarization. The input and output ports of these devices, however, may be modified to be operable with any input polarization. Since the basic structure shown in FIG. 1A is polarization sensitive and requires the input polarization to be in a fixed direction, a special input port may be designed to convert the light polarized not in the fixed direction into the proper polarization.

Figure 9A:
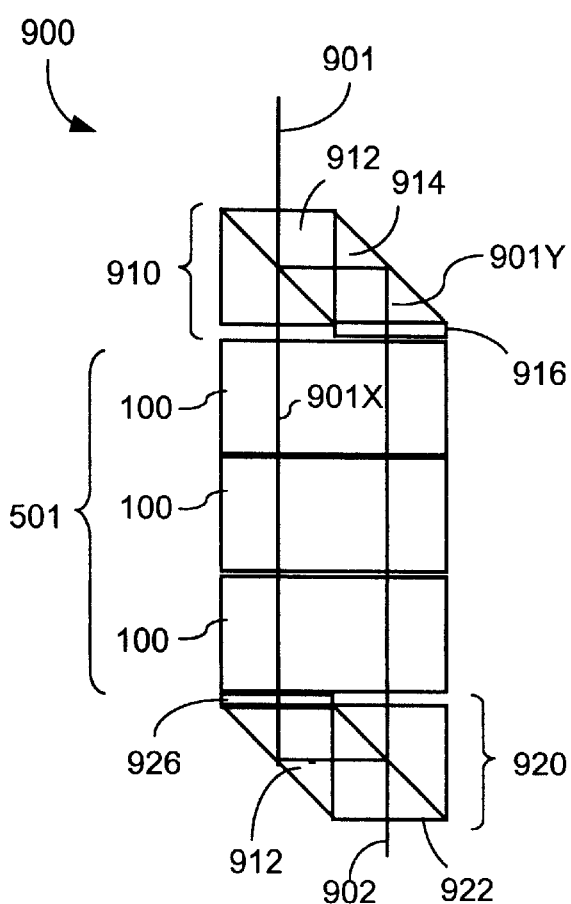
FIGS. 9A, 9B, and 9C show techniques of forming a polarization insensitive device based on the device in FIG. 1A.

FIG. 9A illustrates a polarization-insensitive device 900 which implements special input and output ports 910 and 920 and one or more filtering stages 501 based on the device 100 in FIG. 1A. The input beam 901 is directed by the input port 910 to the port 102a of the PBS 102 in the stage 501. The output port 920 is located to receive output light from the port 102c of the PBS 102 of a corresponding stage. The input and output ports 910 and 920 may be identical in structure as shown but are aligned differently relative to the filtering stages 501 so that the original input polarization can be restored at the output port 920 after the filtering operations in the filtering stages 501. Each of the ports 910 and 920 may include a PBS 912 or 922, an optical reflector 914 or 924 (e.g., a 90-degree prism reflector), and a 90-degree polarization rotator 916 or 926. The reflector 914 or 924 may include a right angle prism or a mirror. The 90-degree polarization rotator 916 or 926 may include a half wave plate or a 90-degree Faraday rotator.

In operation, the PBS 912 partitions the input light 901 into two beams of orthogonal polarizations: a first input beam 901X in the "proper" linear polarization required by the filtering stages 501 for filtering operations shown in FIGS. 1A and 2A–2G, and 3A–3G, and a second beam 910Y in the orthogonal polarization. The reflector 914 is positioned to reflect the second beam 901Y along an path that is substantially parallel to the first 901X in the same direction. The reflected 901Y is also shifted by the reflector 914 from the first beam 901X by a distance so that both beams 901X and 901Y can be processed by the PBS 102 in each filtering stage without clipping. The polarization rotator 916 is disposed between the reflector 914 and the filtering stages 501 to rotate the polarization of the reflected beam 901Y into the same "proper" polarization as the beam 901X. Hence, the second beam 901Y can also be independently and identically processed by the filtering stages 501 at the same time in parallel as the first beam 901X is being processed.

The output port 920 is aligned so that the first beam 901X is directed along a path having the polarization rotator 926, the reflector 924, and the PBS 922. The second beam 901Y is directly sent to the PBS 922 in which the two polarizations are combined to produce an output 902.

Figure 9B:
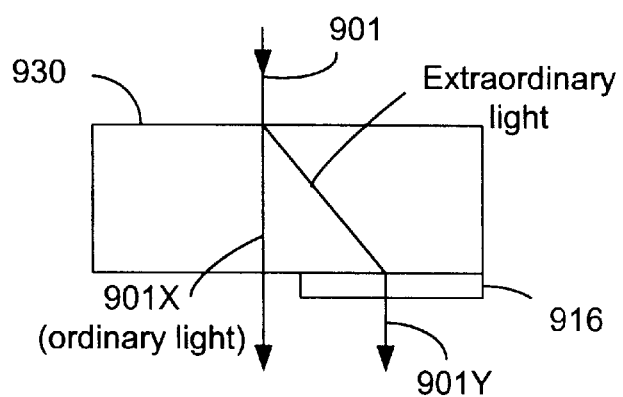

Alternatively, the combination of the PBS and the 90-degree prism reflector in the input and output ports 910 and 920 may be replaced by a single birefringent material such as a polished Calcite crystal to separate the ordinary light and the extraordinary light based on the double refraction. This is shown in FIG. 9B, where the birefringent material block 930 and a polarization rotator 916 are shown. The ordinary light and the extraordinary light are orthogonally polarized to each other and the extraordinary light propagates with an angle relative to the ordinary light in the birefringent material. Both beams merge at the opposite side of the birefringent material at two different locations and become two parallel beams after leaving the crystal. The 90-degree polarization rotator 916 or 926 (e.g., a half wave plate) is still needed to rotate the polarization of one beam to the proper polarization.

Figure 9C:
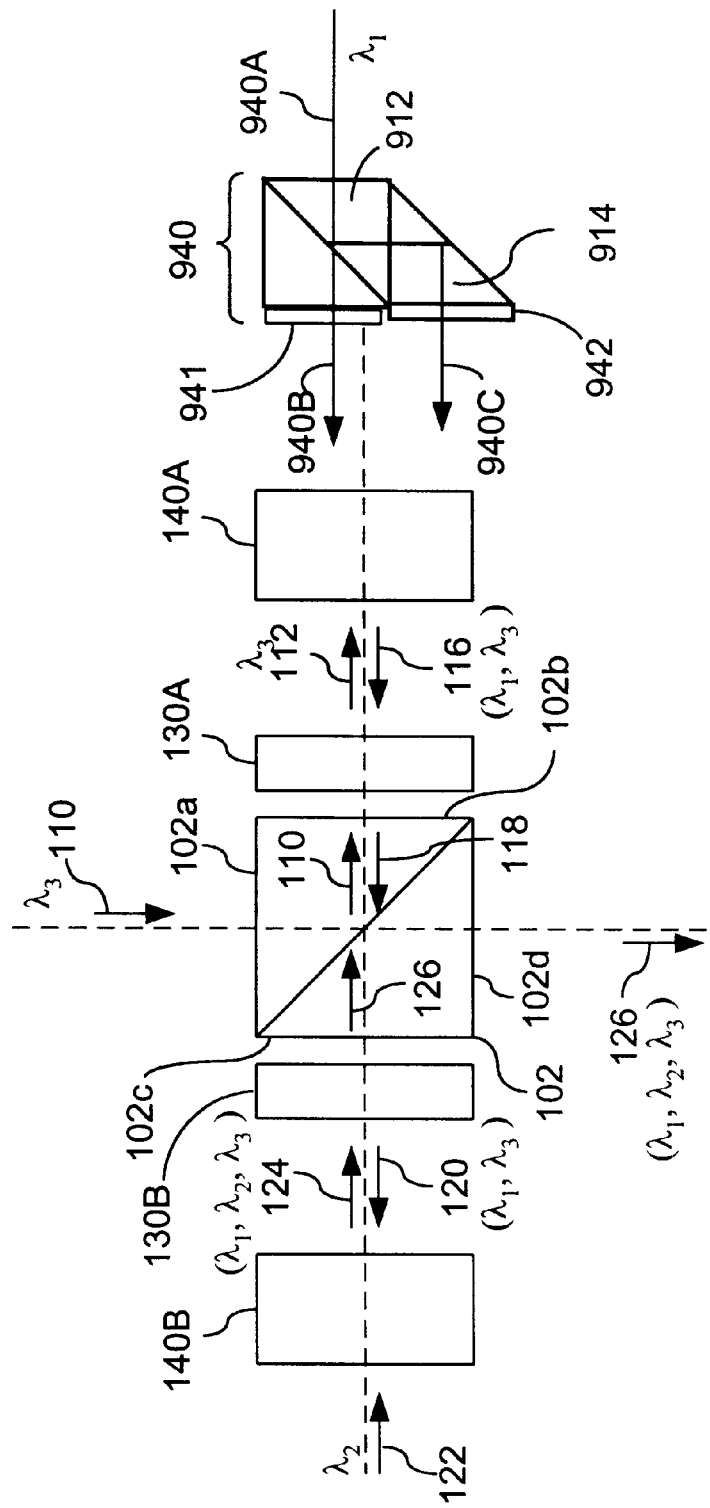

The input/output ports shown in FIGS. 9A and 9B may also be used to make the input to the filters 140A and 140B polarization insensitive. FIG. 9C shows an input port 940 for the input to the filter 140A. Similar to the input port 910 in FIG. 9A, a PBS 912 and a 90-degree prism reflector 914 are used to split the an input beam 940A at the first wavelength λ1 into two orthogonally-polarized beams 940B and 940C. Different from the input port 910 in FIG. 9A, two polarization rotators 941 and 942 are placed in the paths of the beams 940A and 940B to make them the same polarization as shown in FIG. 2C or 3C depending whether the element 130A is a quarter wave plate or a 45-degree Faraday rotator. If the element 130A is a quarter wave plate, the elements 941 and 942 should also be quarter wave plates but are oriented relative to each other in their principal axes by 90 degrees. If the element 130 is a 45-degree Faraday rotator, the elements 941 and 942 should also be 45-degree Faraday rotators. Again, the PBS and the prism reflector may be replaced by the birefringent block shown in FIG. 9B.

Figure 10A:
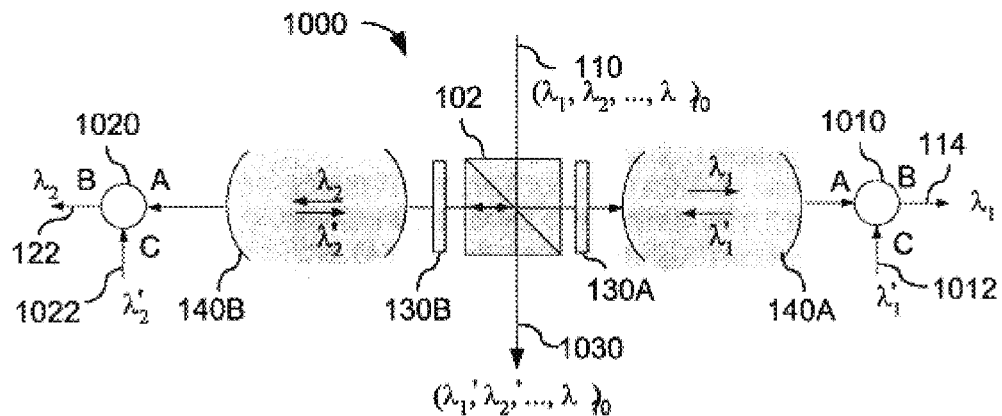
FIGS. 10A and 10B show embodiments of add/drop filters based on the device in FIG. 1A.
Figure 10B:
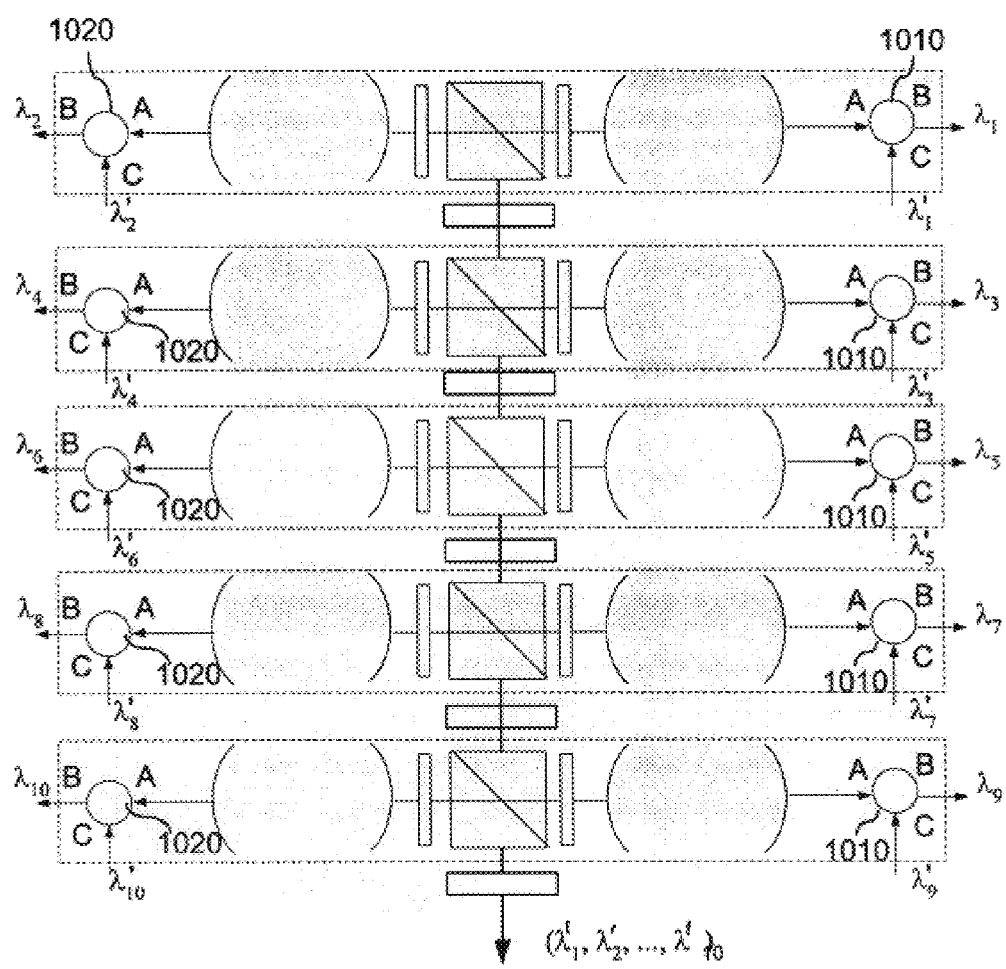

FIGS. 10A and 10B further show that the device 100 in FIG. 1A can also be used to construct add/drop filters. An optical circulator may be coupled to each reflective optical filter for adding or dropping a channel. FIG. 10A shows an add/drop filter 1000 by using two 3-terminal circulators 1010 and 1020 in the device 100 in FIG. 1A. Each circulator is designed to rout light from terminal A to terminal B, from terminal B to terminal C, and from terminal C to terminal A. The circulator 1010 is coupled to the output of the filter 140A to direct the output 114 from A to B for dropping the channel at $\lambda 1$. An add channel 1012 at $\lambda 1$ may be coupled into the terminal C of the circulator 1010 to add to the output 1030. Since the add channel 1012 generally has different information as in the drop channel 114 at the same wavelength, a notation "$\lambda' 1$" is used to represent the add channel 1012 in FIG. 10A. Similarly, the circulator 1020 is coupled to the output of the filter 140B to drop the existing channel 122 at $\lambda 2$ and to add a new channel 1022 at the same wavelength. As in the multiplexing operation shown in FIG. 1B, the polarization of the add channel 1012 may be oriented so that the corresponding transmitted beam, after passing through the element 130A, is in a polarization state that can be directed by the PBS 102 to the element 130B and filter 140B, i.e., being transmissive. The polarization of the add channel 1022, on the other hand, may be oriented so that the corresponding transmitted beam, after passing through the element 130B, is in a polarization state that can be directed by the PBS 102 to the output port as the output 1030, i.e., being reflective.

FIG. 10B shows that the basic device 1000 in FIG. 10A can be cascaded together to form an add/drop filter for processing additional channels.

In the above devices, the filters 140A and 140B may be tunable filters that can shift their transmission band in frequency in response an external control signal. For a multi-layer interferometric filter, for example, one or more layers may change their optical property to the external control signal, such as an index change in response to temperature variation or an external electric filed based on electro-optic effect. For a FP filter, the cavity length may be controlled by (1) thermal heating or cooling or (2) mechanical shift of the two end reflectors by, e.g., a piezo-electric transducer. The medium inside the FP cavity may also change its index in response to the temperature or external electrical field. This tunability of the transmission band of each filter can be used to make the above WDM filtering devices tunable in frequency or dynamically stabilized in frequency.

Figure 11A:
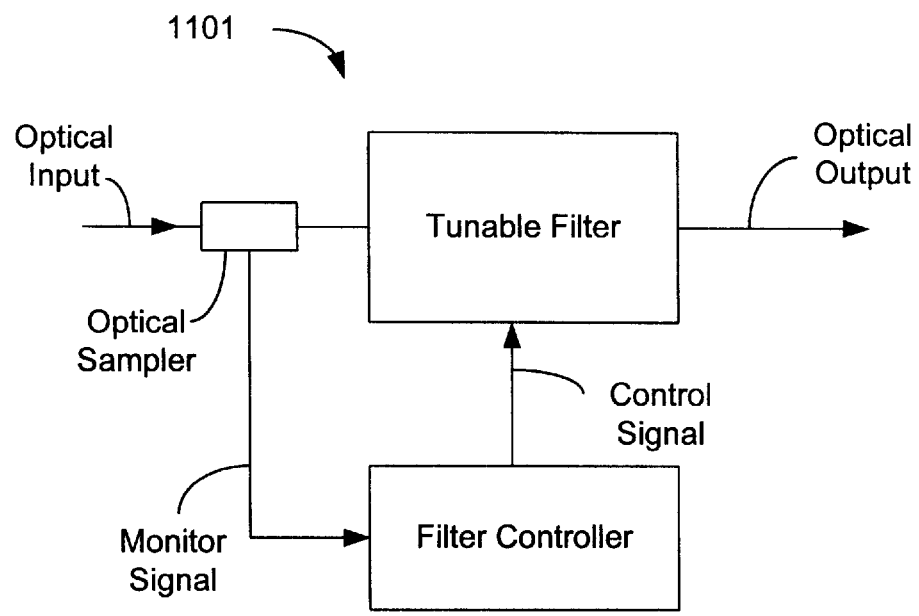
FIGS. 11A and 11B show exemplary control schemes for tuning each filter in the device in FIG. 1A.
Figure 11B:
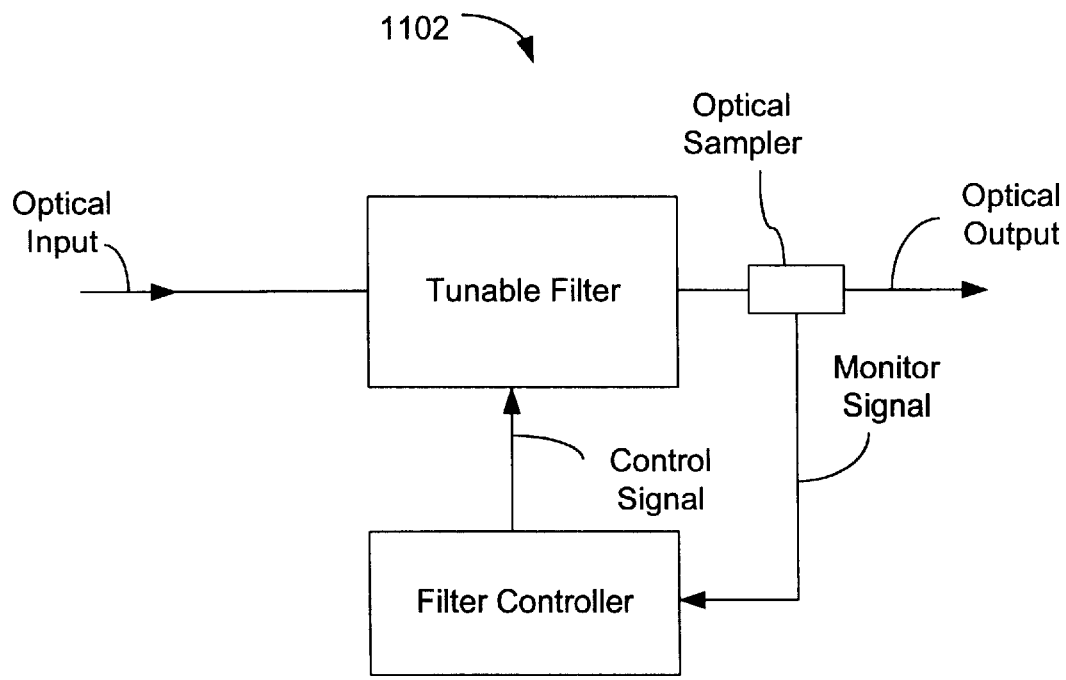

FIGS. 11A and 11B show two different feedback control systems 1101 and 1102 for tuning a filter 140A or 140B. In FIG. 11A, the filter is tuned and locked to the frequency of the input optical signal. An optical sampler is used to measure the frequency of the input optical signal to produce a monitor signal. A controller, coupled to receive the monitor signal, responds to produce a proper control signal to the filter to tune the filter to the input frequency and lock the filter at that position. In FIG. 11B, the output optical signal is sampled and is used to control the filter.

In another control scheme, the filter may be stabilized and the frequency of the input optical signal may be tuned to be locked at the transmission frequency of the filter. Referring back to FIGS. 11B and 6C, the output optical signal may be sampled to determine the deviation of the input frequency form the locking point of the transmission frequency of the filter. A control signal can then be applied to the transmitter laser to adjust the input frequency.

The basic unit shown in FIG. 1A uses a unique butterfly arrangement to make the apparatus space-efficient and scalable, and thus is suitable for combining (or separating) a large number of channels. In one implementation, the device may be designed to have a thickness of less than a centimeter and a width of a few centimeters. Hence, such a WDM filter can accommodate at least 4 channels per centimeter length. Therefore, size of a 40-channel device can be less than $1 \times 5 \times 10$ cm$^3$.

only a few embodiments are disclosed. However, it is understood that variations and enhancements may be made without departing from the spirit of and are intended to be encompassed by the following claims.

What is claimed is:

1. An optical device, comprising:
   a polarizing beam splitter (PBS) to reflect light in a first polarization in an input light beam into a first optical beam and to transmit light in a second, orthogonal polarization as a second optical beam;
   a first filter positioned to receive said first optical beam from said PBS and operable to transmit light at a first wavelength and reflect light at other wavelengths;
   a first polarization rotator positioned in an optical path between said PBS and said first filter to produce a polarization rotation of about 90 degrees on each beam that passes through said first polarization rotator twice;
   a second filter positioned to receive light in said second polarization that is reflected from said first filter and transmits through said PBS, said second filter operable to transmit light at a second wavelength different from said first wavelength and reflect light at other wavelengths; and
   a second polarization rotator positioned in an optical path between said PBS and said second filter to produce a polarization rotation of about 90 degrees on each beam that passes through said first polarization rotator twice.

2. The device as in claim 1, wherein one of said first and said second polarization elements includes a quarter wave plate whose one principal axis forms an angle of about 45 degrees with respect to said first or said second polarization.

3. The device as in claim 1, wherein one of said first and said second polarization elements includes a 45 degree Faraday rotator.

4. The device as in claim 1, wherein one of said first and second filters includes a Fabry-Perot filter.

5. The device as in claim 4, wherein said Fabry-Perot filter includes at least one partially reflective and partially transmissive mirror within its cavity.

6. The device as in claim 1, wherein one of said first and second filters includes a multi-layer interferometric filter.

7. The device as in claim 1, further comprising an optical circulator optically coupled to receive light from and to deliver light to one of said first and said second filters.

8. The device as in claim 1, wherein one of said first and said second filters is tunable in frequency.

9. The device as in claim 1, wherein at least one filter includes:
   a first Fabry-Perot filter and a second Fabry-Perot filter spaced from each other along an optical path; and
   an optical isolator located between said first and said second Fabry-Perot filters, wherein a free spectral range of said first Fabry-Perot filter is a multiple of a free spectral range of said second Fabry-Perot filter.

10. The device as in claim 1, wherein said first and said second filters are Fabry-Perot filters with a common free spectral range, said device further comprising an input bandpass optical filter in a path of said input light beam in front of said PBS, said input bandpass optical filter having a bandwidth not greater than said common free spectral range.

11. A device, comprising:

a coarse WDM optical filter with a first resolvable minimum channel spacing, having a plurality of input terminals and a single output terminal;

a plurality of fine WDM optical filters with a second resolvable minimum channel spacing less than said first resolvable minimum channel spacing, each fine WDM optical filter having a plurality of input terminals to receive WDM channels at said second resolvable minimum channel spacing and an output terminal to output a multiplexed signal with received WDM channels and connected to a respective input terminal of said coarse WDM optical filter, wherein different fine WDM optical filters configured to receive WDM channels at different frequencies, each fine WDM optical filter comprising a plurality of cascaded optical units, each optical unit having:

a polarizing beam splitter (PBS) to reflect light in a first polarization in an input light beam into a first optical beam and to transmit light in a second, orthogonal polarization as a second optical beam;

a first filter positioned to receive said first optical beam from said PBS and operable to transmit light at a first wavelength and reflect light at other wavelengths;

a first polarization rotator positioned in an optical path between said PBS and said first filter to produce a polarization rotation of about 90 degrees on each beam that passes through said first polarization rotator twice;

a second filter positioned to receive light in said second polarization that is reflected from said first filter and transmits through said PBS, said second filter operable to transmit light at a second wavelength different from said first wavelength and reflect light at other wavelengths; and a second polarization rotator positioned in an optical path between said PBS and said second filter to produce a polarization rotation of about 90 degrees on each beam that passes through said first polarization rotator twice.

12. A method, comprising:

directing an input light beam, of a first polarization, along an input signal direction;

using a polarizing beam splitter to reflect the input light beam to a first signal direction perpendicular to the input signal direction;

filtering the input light to transmit light of a first wavelength along the first signal direction and to reflect light of other wavelengths along a second signal direction opposing the first signal direction;

rotating the polarization of the reflected light by about 90 degrees to a second polarization to transmit through the polarizing beam splitter;

filtering the reflected light to transmit light of a second, different wavelength along the second signal direction and to reflect light of other wavelengths along the first signal direction;

rotating the polarization of the reflected light along the first signal direction to be in the first polarization; and reflecting the reflected light in the first polarization by using the polarizing beam splitter back to the input signal direction.

13. The method as in claim 12, wherein each filtering produces a substantially constant amplitude within a transmissive bandpass range.

14. The method as in claim 12, wherein a Fabry-Perot filter is used to perform the filtering and the free spectral range of the filter is greater than the spectral range of different spectral components in the input signal.

15. The method as in claim 14, further comprising filtering the input signal to limit its spectral components less than the free spectral range of the filter before using the polarizing beam splitter to reflect the input light beam.

16. An optical device, comprising:

an input terminal having a polarizing beam splitter which splits an input light beam into a first beam in a first polarization and a second beam in a second, orthogonal polarization, a reflector to direct said second beam to propagate in parallel to said first beam in a path shifted from said first beam, and a polarization rotator to rotate the polarization of said second beam into said first polarization;

an optical filtering stage to receive said first and said second beams from said input terminal that are parallel and are in said first polarization and operable to change a spectral composition of said first and said second beams to produce modified first and second beams; and an output terminal, similarly constructed as said input terminal, positioned to combine said modified first and second beams to form a modified output beam.

17. The device as in claim 16, wherein said optical filtering stage includes:

a polarizing beam splitter (PBS) positioned to receive both said first and said second beams and operable to split an input light beam into said first polarization and said second orthogonal polarization;

a first filter positioned to receive light of said first polarization from said PBS and operable to transmit light at a first wavelength and reflect light at other wavelengths;

a first polarization rotator positioned in an optical path between said PBS and said first filter to produce a polarization rotation of about 45 degrees along a predetermined orientation on each light beam pass therethrough;

a second filter positioned to receive light in said second polarization that is reflected from said first filter and transmits through said PBS, said second filter operable to transmit light at a second wavelength different from said first wavelength and reflect light at other wavelengths; and a second polarization rotator positioned in an optical path between said PBS and said second filter to produce a polarization rotation of about 45 degrees along a predetermined orientation on each light beam pass therethrough.

* * * * *